United States Patent [19]
Currie

[11] 4,085,501
[45] Apr. 25, 1978

[54] METHOD FOR FABRICATION OF INTEGRATED OPTICAL CIRCUITS

[75] Inventor: George Daniel Currie, Brighton, Mich.

[73] Assignee: Environmental Research Institute of Michigan, Ann Arbor, Mich.

[21] Appl. No.: 614,523

[22] Filed: Sep. 18, 1975

[51] Int. Cl.² .................................................. H01S 4/00
[52] U.S. Cl. ........................... 29/593; 29/407; 29/592 R; 29/600; 219/121 EM; 219/121 LM; 350/96.11; 350/162 R
[58] Field of Search ............... 29/600, 601, 592, 593, 29/407; 350/96 WG, 162 R; 73/432 L; 324/73 PC; 219/121 LM, 121 EB, 121 EM; 356/161

[56] References Cited

U.S. PATENT DOCUMENTS

| | | | |
|---|---|---|---|
| 2,985,866 | 5/1961 | Norton | 350/162 R |
| 3,287,563 | 11/1966 | Clunis | 350/162 R |
| 3,386,787 | 6/1968 | Kaplan | 350/96 WG |
| 3,542,536 | 11/1970 | Flam et al. | 350/96 WG |
| 3,623,813 | 11/1971 | Hacman | 356/161 X |
| 3,889,361 | 6/1975 | Croset et al. | 29/600 |

*Primary Examiner*—Victor A. DiPalma
*Attorney, Agent, or Firm*—Synder, Brown & Ramik

[57] ABSTRACT

Method and apparatus are disclosed for making integrated optical circuits. A waveguide in the form of a thin layer of dielectric material is modified as to its coherent radiation transmitting properties by electron beam impingement thereon so as to modulate coherent radiation by mode conversion and mode guiding. Preferably the layer is of thermoplastic material which is locally charged by the electron beam and is heated to allow corresponding deformation due to the forces generated by the localized charging. When cooled, the deformations are frozen in but may be erased by subsequent reheating whereafter the deformation process may be repeated, thus allowing reuse of the device for a different optical circuit, or allowing its modification to form a different optical circuit.

11 Claims, 4 Drawing Figures

METHOD FOR FABRICATION OF INTEGRATED OPTICAL CIRCUITS

BACKGROUND OF THE INVENTION

This invention relates to method and apparatus for producing optical components usable with coherent light. A number of developments have been reported and studied recently which relate to guided-wave propagation of coherent light, among which are those which utilized photolithographic techniques. For example, as described in an article by S. E. Miller, pages 199-205, IEEE Journal of Quantum Electronics, Vol. QE-8, No. 2, February 1972, a sputtered film of refractive index $n_2$ is applied to a substrate and a subsequent film of index $n_1$ ($n_2 > n_1$) is then provided and is coated with photoresist material. An image of the desired optical circuit is developed in conventional fashion on the film of index $n_1$ using visible or ultraviolet radiation to expose the photoresist, and chemical etching of the film of index $n_1$ is effected. Finally, a covering layer of index $n_2$ is sputtered on the exposed portions of the first film and the remaining portions of the second film.

Because of losses in propagated radiation due to waveguide edge roughness obtained with this technique, the photoresist has been exposed by electron beams with resultant waveguide wall smoothness suitable for reducing losses in propagated radiation to acceptable levels.

An alternative technique utilizing photolithography involves forming a mask of locally exposed photoresist coating on a fused quartz substrate and implanting ions into the substrate through the mask slightly to raise the refractive index in the exposed, localized areas of the substrate.

Various synthetic resinous materials have been used for surface wave propagation of coherent light, as for example epoxy films compressed between glass plates as described by R.Shubert and J. H. Harris, IEEE Trans. Microwave Theory Techl, vol. MTT-16, pp. 1048-1054, 1968. Integrated optical circuits employing shaped structure of the same thickness of the film, and whose dielectric constant is intermediate between that of the base and that of the film, and shaped to conform with the usual lens laws is suggested.

Other techniques involving synthetic resin films have also been suggested.

BRIEF SUMMARY OF THE INVENTION

The present invention is directed to the method of forming optical components and integrated optical circuits usable with coherent radiation, in which the desired optical effect or effects are achieved by direct impingement of an electron beam upon a thin layer of synthetic resinous material. In this way, the sharpness and definition of electron beams can be used to advantage but without the tedious and time consuming photolithographic techniques previously employed.

The optical effects induced by the electron beam may be birefringence, polymerization, scission or cross-linking. However, it is preferred that the optical effects be achieved by deformation of the plastic layer. The plastic layer may be thermoplastic in which case deformation may be as permanent as desired, or the layer may be an elastomer with deformation being sustained by means of the electron beam-deposited charge which induces it.

Grating couplers, tapered edge couplers, beam splitters, layered mirrors, lasers, prisms, lenses and the like may be formed in the synthetic resinous layers as components of intergrated optical circuits.

BRIEF DESCRIPTION OF THE DRAWING FIGURES

DETAILED DESCRIPTION OF THE INVENTION

Figure 1:
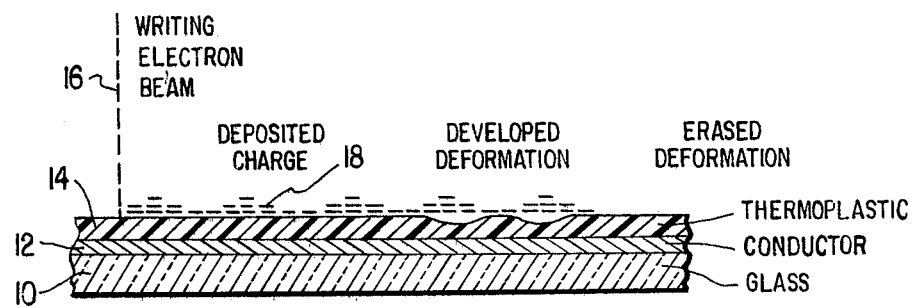
FIG. 1 is sectional view illustrating one form of the present invention.

With reference at this time more particularly to FIG. 1, certain principles according to the present invention will be elucidated therein. As shown, a suitable dielectric substrate in the form of a flat plate 10 is provided with a transparent layer 12 of conductive material thereon. The substrate may be fused silica such as "Homosil" or "Suprasil" which are used in lasers and other optical applications. The refractive index of this material can be 1.45 and is lower than that of the layer 14. For example, the transparent layer 12 may be reactively sputtered onto or evaporated onto the surface of the glass plate 10 by conventional means, it being understood that the various thicknesses of the substrate 10 and the layers 12 and 14 are not to scale in FIG. 1, the layers 12 and 14 being extremely thin. A typical thickness for the layer 12 would be 1000A. The thickness of the layer 14 depends in part upon the wavelength of the radiation with which it is to be used. For, example, the thickness of the layer 14 may range from 0.5 microns of a few tens of microns. On the exposed surface of the conductive layer 12 there is deposited by evaporation techniques or other means a thin layer 14 of thermoplastic material. Various materials such as styrene-methacrylate copolymers may be utilized for the layer 14 but polystrenes are preferred. With materials of this nature, components can be made which operate from the near ultraviolet out to wavelengths beyond 15 microns.

As illustrated in FIG. 1, a writing electron beam 16 is caused to impinge directly upon the exposed surface of the thermoplastic layer 14 and is scanned thereacross with suitable modulation of the electron beam such that discrete deposited charge areas such as the region 18 are formed. The plastic may be heated while the beam is writing or it can be heated after the desired charge pattern is deposited so that, in any case, the film is deformed by the electric forces between the charges and their images in the conducting layer 12. Such deformation is shown in the right-hand side of FIG. 1 and after the deformation has taken place, the plastic layer is cooled so that the deformations are frozen in the thermoplastic layer.

As is also illustrated in FIG. 1, the deformation process is reversible simply by heating the plastic film to a higher temperature than the development temperature, in which case the deformations are erased and the film is ready for reuse.

In the scanning or writing process, the discretely deposited charge regions 18 are provided with charge density controlled by the modulation of the electron beam 16, the modulation being controlled in accord with data being written in.

Figure 2:
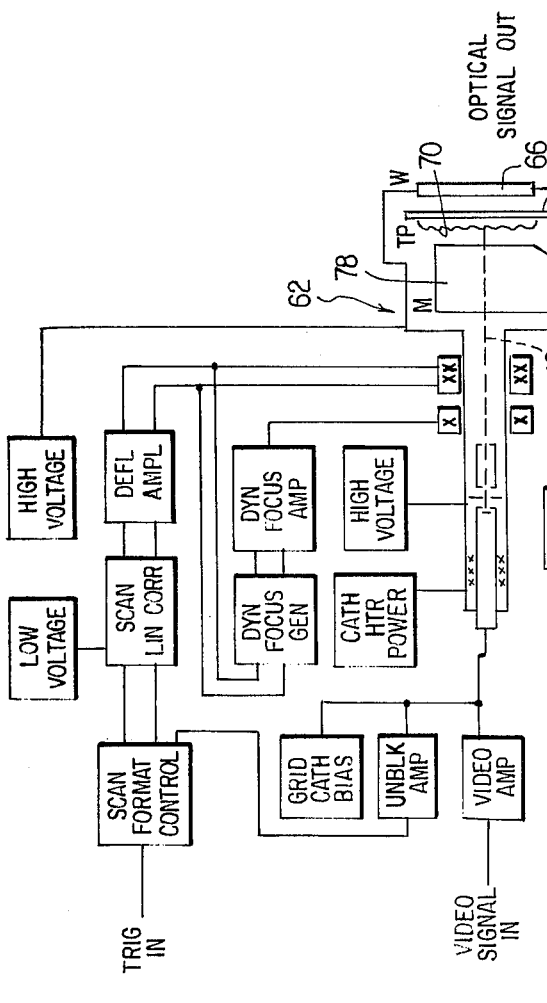
FIG. 2 is a view illustrating the manner of reading out information in propagated beam mode.

Apparatus for forming a modulator according to FIG. 1 is illustrated in FIG. 2. In FIG. 2, a conventionally constructed removable face plate cathode ray tube is indicated generally by the reference character 28 and will be seen to include an electron gun 30 which emits the electron beam 16 in accord with the modulation of a suitable video input signal at 32. The horizontal and vertical deflection coils are indicated generally at 34 and the triggering input at 36 is processed through a scan format control circuit 38 and a scan linearity controlling circuit 40 and then to the deflector amplification circuits 42 so as to achieve good linearity of the scanning as is necessary accurately to correlate the scan position with the modulation of the video input signal at 82. The circuitry diagrammatically illustrated in FIG. 2 is conventional and well known.

The substrate 10 forms the fixed face plate of the CRT 28 and is removable therefrom by means of a conventional sealing coupling arrangement 44 so that the face plate may be removed as desired and provided with the conductive film 12 and the thermoplastic layer 14 as described in conjunction with FIG. 1. When the CRT is assembled, the tube is evacuated and a writing-in process is now possible as described in conjunction with FIG. 1. Ordinarily, the electron beam is focussed to small size and the data input is written in as desired along the discrete scan lines forming the raster of the tube.

Internally of the tube there is provided a mirror 46 and externally thereof a mirror 48 which cooperates with the laser device 50 and collimating optics 52 thereof so as to enable testing of the optical intergrated circuit written-in to the layer 14 before disassembling the tube and removing the optical circuit formed by the written-in process. The body of the tube is provided with a window 54 allowing entry of the collimated laser beam.

In the apparatus shown in FIG. 2, the conductive layer 12 of the modulator assembly is connected to an external supply 60 for heating the thermoplastic layer to the desired temperature which allows deformation in accord with the selective electrical charges effected by modulation of the electron beams 16. The charges may be written in on a single scan of each raster line or several repetitive cycles may be utilized by in any event when the data is written in, the supply of energy from the source 60 is terminated to allow the thermoplastic layer to cool thus freezing in the data information in the form of the localized deformations as described hereinabove. Provision may be made for segmentizing the conductive film 12 so as selectively to heat discrete areas of the thermoplastic layer 14 whereby to prevent erasure thereof in the event that the testing by read out of the data indicated that for any reason it must be modified, whereafter this line or area of data may be written in again and once more tested for accuracy.

Figure 3:
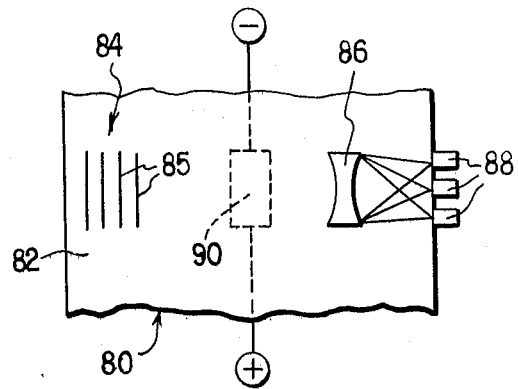
FIG. 3 is a plan view illustrating an integrated circuit according to one embodiment of the present invention.
Figure 4:
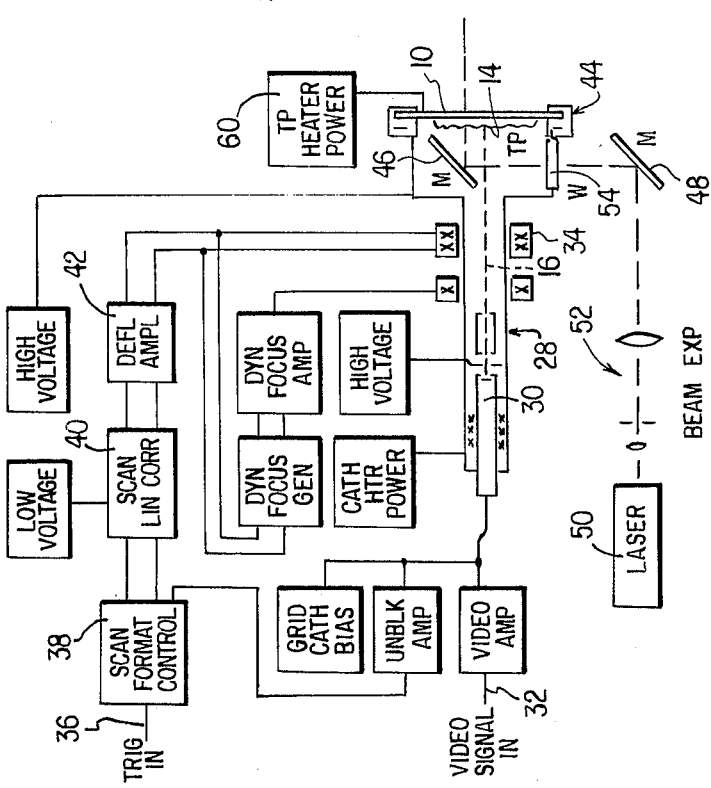
FIG. 4 is a block diagram view illustrating apparatus according to one embodiment of the invention.

Apparatus similar to that shown in FIG. 2 but providing for capability of a much greater area in which to write in information is illustrated in FIG. 4. In FIG. 4, the removable face plate cathode ray tube is indicated generally by the reference character 62 and is similar to that described in conjunction with the cathode ray tube 28 in FIG. 2 excepting that the face plate region is much larger, as can be readily seen. In this case, the face plate is indicated at 64 and is provided with a transparent window 66 and internally of the tube there is provided a disc 68 of quartz upon which is deposited the conductive film 12 in the form of an annulus and, on top of that, an annular ring of thermoplastic material indicated at 70. The disc 68 is mounted on a shaft 72 driven by a motor 74 under control of a circuit 76 accurately to position the disc 68 rotationally. The writing-in process is identical with that described in conjunction with FIGS. 2 and 1 and the only difference is that when one area of the layer 70 is filled with input data and has been tested, the disc 68 is rotated to a new position to present a further area of the layer 70 for further writing-in of data. The full read out system is not shown in FIG. 3 but the internal mirror 78 of such system is shown. Alternatively, the disc can be continuously rotated during write-in to generate a very large integrated optical circuit.

The techniques employed and described can be utilized to form integrated optical circuits utilizing propagated circuit waves in the thermoplastic material. An example of such an integrated optical circuit is illustrated in FIG. 3. In FIG. 3, a section of an integrated optical circuit suitable for generation of the Fourier transform of one dimensional data is indicated generally by the reference character 80 which includes the thermoplastic layer 82. Incident laser radiation is coupled into the layer 82 through the medium of a grating coupler indicated generally by the reference character 84. The grating coupler simply takes the form of a series of parallel indentations 85 formed in the surface of the layer 82 and which conveniently may be deformed by the scans of the electron beam 16 along portions of discrete scan lines during which the beam intensity and scanning movement are constant to produce the necessary grating effect so as to couple the incident radiation into the plane of the layer 82, according to well known principles. A negative lens-shaped indentation area 86 is formed in the thermoplastice layer 82 in order to focus the radiant energy toward the photodetector elements 88 positioned properly at the necessary intervals to intercept the emergent radiation. The lens 86 must be of negative shape because of the indentation techniques involved in accordance with the present invention and modulation of any suitable type may be utilized in the region of the layer between the grating coupler 84 and the Fourier transform lens 86. The photodetectors 88 indicate the strength of the Fourier components and the frequency content of the data. In the specific embodiment shown, modulation may be effected on a real time basis by energizing a discrete area portion 90 of the conductive film 12 correspondingly to permit selective heating of the confined region of the layer 82. Thus, data may be written in to this confined area by means of electron beam scanning and then the heater area 90 may be energized to elevate the temperature of the localized area of the layer 82 and erase this data whereafter new data may be written in to update as desired. The Fourier transform of the data entered at area 90 is formed by the lens 86 at the detectors 88 in well known fashion. The strength of the Fourier components of the signals entered at 90 is read out by detectors 88 whose electrical output is monitored by a suitable device (meters, tape recorder, digital computer, etc.).

However, any conventional method of modulation may be utilized as for example by means of electro-optic effects in the plastic, surface acoustic waves in the guide layer or its substrate, electric field induced absorption-edge of material dissolved in the plastic, and photoelastic effects.

A waveguide channel may be easily formed simply by a pair of parallel lines or, if curved or complicated shapes are required, by suitable control of the electron beam. For writing in such indented areas as the negative lens 86 of FIG. 3, defocusing and widening of the electron beam so as to overlap between adjacent raster lines is necessary and for any curved shape, the input to the system of FIG. 4 most conveniently can take the form of suitable output signals from a television camera. For example, the optical circuits such as the grating coupler 84 and the negative lens 86 may be accurately drawn on large scale on a suitable background such as a piece of paper and the t.v. camera focused thereon with suitable reduction taking place to the final deflection of the electron beam 16 accurately to reproduce the optical components in the thermoplastic layer. For waveguide channel applications, the indentation process is particularly suitable in avoiding edge roughness because of the surface tension characteristic of the thermoplastic material which tends to smooth out the edges of any channel so formed thereby avoiding a serious problem attendant even upon the formation of channels by photolithographic processes where exposure of the photoresist is effected by electron beam bombardment.

Although physical deformation of the guide material is preferred, other effects can be utilized which are produced by the direct impingement of the electron beam upon a synthetic resinous layer. Thus, for example, birefringence effects both with and without deformation may be utilized to advantage. The induced birefringence is caused by polarization of the plastic molecules by the electric fields which cause deformation. After deformation the birefringence is frozen in the plastic and one can utilize either this birefringence, while the plastic is in the deformed condition, or the deformation can be erased at a temperature at which the birefringence remains. When necessary, the birefringence can be erased by heating the film to an even higher temperature.

The deformation of the thermoplastic layer can also be utilized to advantage in producing a master from which replications can be made by conventional techniques.

What is claimed is:

1. The method of making an integrated optical circuit, which comprises the steps of:
   (a) forming a layer of synthetic resinous material capable of supporting guided wave propagation of coherent light and having a selected index of refraction on a substrate which comprises a material having an index of refraction less than said selected index of refraction; and
   (c) forming by selected local impingement of a scanning electron beam directly on said layer, series of optical components optically aligned in said layer and which optically affect guided wave propagation of coherent light supported by said layer.

2. The method of making an integrated optical component, which comprises the steps of:
   (a) forming a transparent thin conductive layer on a substrate having a selected index of refraction;
   (b) applying a thin film layer of thermoplastic material on said conductive layer, said thin film layer having an index of refraction which is greater than said selected index of refraction.
   (c) forming by locally electrically charging the exposed surface of said thermoplastic layer by electron beam deposition, a series of optical components optically aligned in said layer and which optically affect guided wave propagation of coherent light supported by said layer;
   (d) heating said thermoplastic layer, while locally electrically charged as a result of step (c), to a temperature sufficient to permit local deformations of said thermoplastic layer due to the forces resulting from the local electrical charging thereof; and
   (e) cooling said thermoplastic layer to freeze said local deformations therein.

3. The method as defined in claim 1 wherein said layer of material is thermoplastic and step (b) includes heating said material to a temperature sufficient to permit local deformation of said thermoplastic layer due to forces resulting from local charging thereof by said electron beam and then cooling said layer to freeze such deformations therein.

4. The method of making an integrated optical circuit, which comprises the steps of:
   (a) forming on a substrate a layer of synthetic resinous thermoplastic material capable of supporting guided wave propagation of coherent light; and
   (b) forming a series of aligned optical components in said layer by heating said material to a temperature sufficient to permit local deformation of said thermoplastic material due to forces resulting from local charging thereof by an electron beam, forming a series of aligned optical components in said layer by selected local impingement of a scanning electron beam directly on said layer, and then cooling said layer to freeze such deformations therein, said electron beam being scanned along a series of spaced, parallel paths to form a grating coupler in said layer, and an area defining the planform shape of a negative lens being scanned by the electron beam.

5. The method of making an integrated optical circuit, which comprises the steps of:
   (a) forming on a substrate a layer of synthetic resinous thermoplastic material capable of supporting guided wave propagation of coherent light; and
   (b) forming a series of aligned optical components in said layer by heating said material to a temperature sufficient to permit local deformation of said thermoplastic material due to forces resulting from local charging thereof by an electron beam, forming a series of aligned optical components in said layer by selected local impingement of a scanning electron beam directly on said layer, and then cooling said layer to freeze such deformations therein, an area defining the planform shape of a negative lens being scanned by the electron beam.

6. The method of making an integrated optical circuit, which comprises the steps of:
   (a) forming on a substrate a layer of synthetic resinous material capable of supporting guide wave propagation of coherent light; and
   (b) forming a series of aligned optical components in said layer by selected local impingement of a scanning electron beam directly on said layer, the electron beam being scanned along a series of spaced, parallel paths to form a grating coupler in said layer and an area defining the planform shape of a negative lens being scanned by the electron beam.

7. The method of making an integrated optical circuit, which comprises the steps of:

(a) forming on a substrate a layer of synthetic resinous material capable of supporting guided wave propagation of coherent light; and (b) forming a series of aligned optical components in said layer by selected local impingement of a scanning electron beam directly on said layer, an area defining the planform shaped of a negative lens being scanned by the electron beam.

8. The method of making an integrated optical component, which comprises the steps of:

(a) forming a thin conductive layer on a substrate;

(b) applying a thin film layer of thermoplastic material on said conductive layer;

(c) forming, by locally electrically charging the exposed surface of said thermoplastic layer by electron beam deposition, a series of optical components optically aligned in said layer and which optically affect guided wave propagation of coherent light supported by said layer;

(d) heating said thermoplastic layer, while locally electrically charged as a result of step (c), to a temperature sufficient to permit local deformations of said thermoplastic layer due to the forces resulting from the local electrical charging thereof; and (e) cooling said thermoplastic layer to freeze said local deformations therein;

step (c) including scanning the electron beam along a series of spaced, parallel paths to form a grating coupler in said layer and an area defining the planform shape of a negative lens being scanned by the electron beam.

9. The method of making an integrated optical component, which comprises the steps of:

(a) forming a thin conductive layer on a substrate;

(b) applying a thin film layer of thermoplastic material on said conductive layer;

(c) forming, by locally electrically charging the exposed surface of said thermoplastic layer by electron beam depostiion, a series of optical components optically aligned in said layer and which optically affect guided wave propagation of coherent light supported by said layer;

(d) heating said thermoplastic layer, while locally electrically charged as a result of step (c), to a temperature sufficient to permit local deformations of said thermoplastic layer due to the forces resulting from the local electrical charging thereof; and (e) cooling said thermoplastic layer to freeze said local deformations therein;

an area defining the planform shape of a negative lens being scanned by the electron beam in step (c).

10. The method of making an optical component usable with coherent light, which comprises the steps of:

(a) forming a conductive layer on a substrate;

(b) forming a layer of thermoplastic dielectric material on said conductive layer;

(c) forming a series of aligned optical components in said thermoplastic layer by positioning said substrate in predetermined relation to an electron beam gun and sweeping the electron beam from the gun over localized regions of said thermoplastic layer while controlling the intensity of said electron beam whereby locally to charge said thermoplastic layer;

(d) heating said thermoplastic layer, while locally electrically charged as a result of step (c), to a temperature sufficient to permit local deformations of said thermoplastic layer due to the forces resulting from the local electrical charging thereof;

(e) cooling said thermoplastic layer to freeze said local deformations therein;

(f) directing a laser beam onto said thermoplastic layer to test the accuracy of said local deformations therein while said substrate is still in predetermined position as defined in step (b); and thereafter (g) removing the substrate for use in a coherent optical system.

11. The method as defined in claim 10 including the further steps, subsequent to step (f) but prior to step (g), of moving the substrate to a new position relative to the electron gun and repeating steps (d) – (f) with respect to the thermoplastic layer.

* * * * *